(12) United States Patent
Kim

(10) Patent No.: US 11,837,069 B2
(45) Date of Patent: Dec. 5, 2023

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Singu Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 211 days.

(21) Appl. No.: 17/387,141

(22) Filed: Jul. 28, 2021

(65) Prior Publication Data
US 2022/0139197 A1 May 5, 2022

(30) Foreign Application Priority Data
Nov. 5, 2020 (KR) .................... 10-2020-0146777

(51) Int. Cl.
*G08B 21/00* (2006.01)
*G08B 21/18* (2006.01)
(Continued)

(52) U.S. Cl.
CPC ........ *G08B 21/182* (2013.01); *B60R 11/0217* (2013.01); *B60R 11/04* (2013.01);
(Continued)

(58) Field of Classification Search
CPC ........ G08B 21/182; G08B 3/10; G08B 5/222; G08B 25/016; G06V 20/58; G06V 20/56; G06V 20/588; B60R 11/0217; B60R 11/04; B60R 16/03; B60R 16/00; B60R 16/02; B60R 16/0307; B60R 16/0315; B60R 16/033; B60R 11/00; B60R 1/00; B60R 2300/00; B60R 2300/607; B60R 2300/806; B60R 2300/8086; B60W 50/14; B60W 10/06; B60W 30/08; B60W 2050/0005; B60W 2050/143; B60W 2050/146;
(Continued)

(56) References Cited

U.S. PATENT DOCUMENTS

| 2002/0113876 A1* | 8/2002 | Kim .................... B60R 25/1004 348/E7.086 |
| 2015/0025917 A1* | 1/2015 | Stempora ........... G02B 27/0093 705/4 |
| 2021/0039639 A1* | 2/2021 | Song .................. G01C 21/3415 |

FOREIGN PATENT DOCUMENTS

CN 112956274 A * 6/2021 ............ H04W 74/08

\* cited by examiner

*Primary Examiner* — Hai Phan
*Assistant Examiner* — Anthony D Afrifa-Kyei
(74) *Attorney, Agent, or Firm* — McDonnell Boehnen Hulbert & Berghoff LLP

(57) ABSTRACT

A vehicle includes a plurality of cameras configured to capture a surrounding situation of the vehicle, an external speaker configured to output a sound to the outside of the vehicle, a communicator configured to communicate with a first server, and a controller configured to determine a degree of risk of the dangerous situation based on the degree of risk based on a case where a dangerous situation is captured through the plurality of cameras, to control an Ultra Wide Band (UWB) module to detect obstacles around the vehicle, to control at least one of a digital key and an external speaker to output a message for the dangerous situation or an image in which the dangerous situation is captured, and to transmit the image in which the dangerous situation is captured to the first server through the communicator.

20 Claims, 8 Drawing Sheets

(51) Int. Cl.
    *G08B 3/10*     (2006.01)
    *B60R 11/02*     (2006.01)
    *B60R 11/04*     (2006.01)
    *G08B 5/22*     (2006.01)
    *G06V 20/58*     (2022.01)

(52) U.S. Cl.
    CPC ............... *G06V 20/58* (2022.01); *G08B 3/10* (2013.01); *G08B 5/222* (2013.01)

(58) Field of Classification Search
    CPC ......... B60W 2420/42; B60W 2420/54; B60W 2552/50; B60W 2556/45; B60W 30/06; B60W 40/02; B60W 2554/00; B60W 2556/50; B60W 2556/65; G06F 18/00; B60Y 2300/08; B60Y 2400/30; B60Y 2300/06; B60Y 2400/92; H04W 4/02; H04W 88/02; A61B 5/18; A61B 5/4806; G08G 1/205; G08G 1/168; B60T 7/22; B60T 2201/10; B60T 2210/36; B60Q 9/002; B62D 15/0285; G02B 27/01; G02B 2027/0123; G02B 2027/0138; G02B 2027/014; H04N 7/181; B60K 2370/21

See application file for complete search history.

FIG. 4A

"PARKING HERE IS DANGEROUS."

FIG. 4B

"IT'S DANGEROUS WHERE YOU PARK RIGHT NOW."

FIG. 5A

"PLEASE MOVE AWAY FROM THE VEHICLE"

FIG. 5B

"I WILL START RECORDING VIDEO FROM NOW ON."

FIG. 5C

"IF YOU TAKE A DANGEROUS ACTION, YOU WILL BE AUTOMATICALLY CONNECTED TO THE POLICE STATION"

FIG. 5D

"I AM THE OWNER OF THE VEHICLE. WHAT IS GOING ON?"

FIG. 5E

"I AM THE OWNER OF THE VEHICLE. PLEASE STEP OUT OF THE VEHICLE. YOU MAY GET HURT."

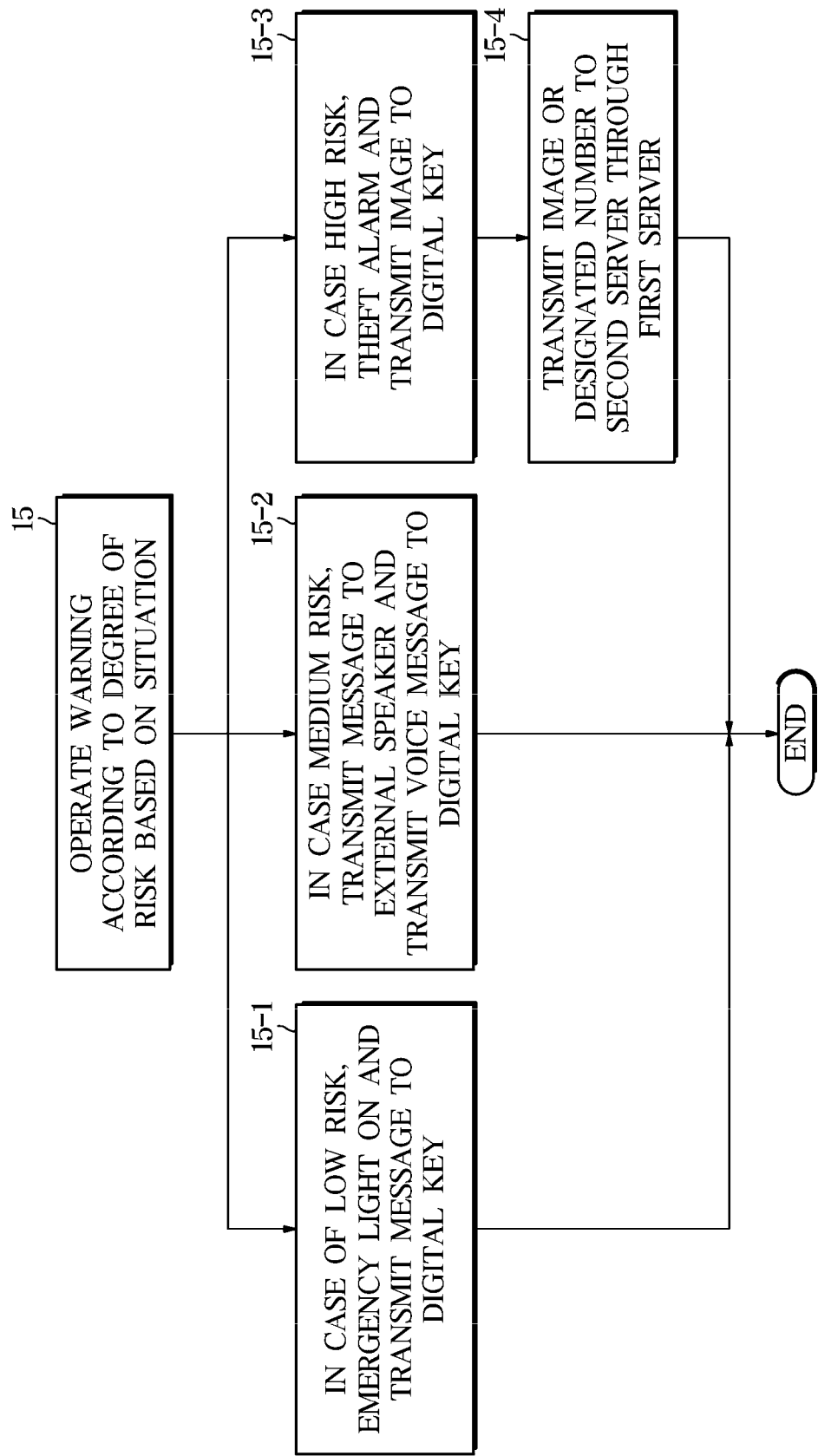

VEHICLE AND METHOD OF CONTROLLING THE SAME

CROSS REFERENCE TO RELATED APPLICATIONS

This application is based on and claims priority under 35 U.S.C. § 119 to Korean Patent Application No. 10-2020-0146777, filed on Nov. 5, 2020, the disclosure of which is incorporated herein by reference.

BACKGROUND

1. Field

The disclosure relates to a vehicle and a method of controlling the vehicle.

2. Description of Related Art

Recently, a digital key (smart phone) system has been widely applied, and a built-in cam, which is called a black box in a market, is also being applied to a vehicle. In addition, many closed-circuit televisions (CCTVs) are installed near homes and roads.

As such, we are considering a method to keep safety by utilizing technologies such as an image, and technological advances are being made using a connected concept such as a digital key.

Currently, a development of convergence technology with digital keys and vehicle surrounding images is being carried out in a variety of ways, and a plan to connect the technology proven in a recent IT field to the vehicle is being considered. In addition, as interest in safety and security using the image is increasing, it is sometimes used to determine a suspicious person in advance using the image as a technology for access security. In addition, the vehicles are becoming common in the era of outdoor and indoor cameras and connected vehicles, but the current vehicle security technology is only a follow-up action after an accident occurs. In other words, when an impact is detected, the images are stored in the front and rear, and there are only follow-up actions such as a simple theft alarm notification.

SUMMARY

An aspect of the disclosure is to provide a vehicle that determines in advance whether a dangerous situation or a suspicious person exists around the vehicle, and informs a user in various ways according to a degree of risk of the dangerous situation, and a method of controlling the vehicle.

Additional aspects of the disclosure will be set forth in part in the description which follows and, in part, will be obvious from the description, or may be learned by practice of the disclosure.

According to an aspect of the disclosure, there is provided a vehicle including a plurality of cameras configured to capture a surrounding situation of the vehicle, an external speaker configured to output a sound to the outside of the vehicle, a communicator configured to communicate with a first server, and a controller configured to determine a degree of risk of the dangerous situation, based on the degree of risk, based on a case where a dangerous situation is captured through the plurality of cameras, to control an Ultra Wide Band (UWB) module to detect obstacles around the vehicle, to control at least one of a digital key and an external speaker to output a message for the dangerous situation or an image in which the dangerous situation is captured, and to transmit the image in which the dangerous situation is captured to the first server through the communicator.

The controller may be configured to control a power of some of the plurality of cameras based on at least one of the degree of risk and a user input received on the digital key.

The controller may be configured to search position information of the digital key based on the case in which the dangerous situation is captured through the plurality of cameras, to transmit the image in which the dangerous situation is captured to the digital key based on the position information of the digital key and the degree of risk, and to control to output the captured image from the digital key.

The controller may be configured to control the external speaker to output at least one of a user's voice received by the digital key and a voice corresponding to the message for the dangerous situation.

Based on a case where a user input is not received in the digital key for a predetermined time after transmitting the message for the dangerous situation to the digital key, the controller may be configured to retransmit the message for the dangerous situation to another digital key.

The controller may be configured to perform a suspect determination algorithm to determine whether the situation captured from the plurality of cameras is the dangerous situation.

Based on the degree of risk, the first server may be configured to store at least one of the image in which the dangerous situation is captured, the image for the dangerous situation, and position information of the vehicle at a time when the dangerous situation occurs.

The first server may be configured to transmit the image in which the dangerous situation is captured to the second server based on the degree of risk.

The first server may be an external server of the vehicle that stores information related to the vehicle. The second server may be a server of an external company.

The controller may be configured to provide a push notification to the digital key based on the degree of risk.

According to another aspect of the disclosure, there is provided a method of controlling a vehicle including based on a case where a dangerous situation is captured through the plurality of cameras, determining, by a controller, a degree of risk of the dangerous situation, based on the degree of risk, controlling, by the controller, an Ultra Wide Band (UWB) module to detect obstacles around the vehicle, controlling, by the controller, at least one of a digital key and an external speaker to output a message for the dangerous situation or an image in which the dangerous situation is captured, and transmitting, by the controller, the image in which the dangerous situation is captured to the first server.

The method may further include controlling, by the controller, a power of some of the plurality of cameras based on at least one of the degree of risk and a user input received on the digital key.

The method may further include, based on the case in which the dangerous situation is captured through the plurality of cameras, searching, by the controller, position information of the digital key; based on the position information of the digital key and the degree of risk, transmitting, by the controller, the image in which the dangerous situation is captured to the digital key, and controlling, by the controller, to output the captured image from the digital key.

The method may further include controlling, by the controller, the external speaker to output at least one of a user's voice received by the digital key and a voice corresponding to the message for the dangerous situation.

The method may further include, based on a case where a user input is not received in the digital key for a predetermined time after transmitting the message for the dangerous situation to the digital key, retransmitting, by the controller, the message for the dangerous situation to another digital key.

The method may further include performing, by the controller, a suspect determination algorithm to determine whether the situation captured from the plurality of cameras is the dangerous situation.

Based on the degree of risk, the first server may be configured to store at least one of the image in which the dangerous situation is captured, the image for the dangerous situation, and position information of the vehicle at a time when the dangerous situation occurs.

The first server may be configured to transmit the image in which the dangerous situation is captured to the second server based on the degree of risk.

The first server may be an external server of the vehicle that stores information related to the vehicle. The second server may be a server of an external company.

The method may further include providing, by the controller, a push notification to the digital key based on the degree of risk.

BRIEF DESCRIPTION OF THE FIGURES

These and/or other aspects of the disclosure will become apparent and more readily appreciated from the following description of the embodiments, taken in conjunction with the accompanying drawings of which:

FIGS. 4A and 4B are views illustrating a screen output to a digital key of a vehicle according to an embodiment of the disclosure.

FIGS. 5A, 5B, 5C, 5D, and 5E are views illustrating a message for a voice output to an external speaker of a vehicle according to an embodiment of the disclosure.

FIG. 7 is a flowchart illustrating a method of controlling a vehicle according to another embodiment of the disclosure.

DETAILED DESCRIPTION

Figure 1:
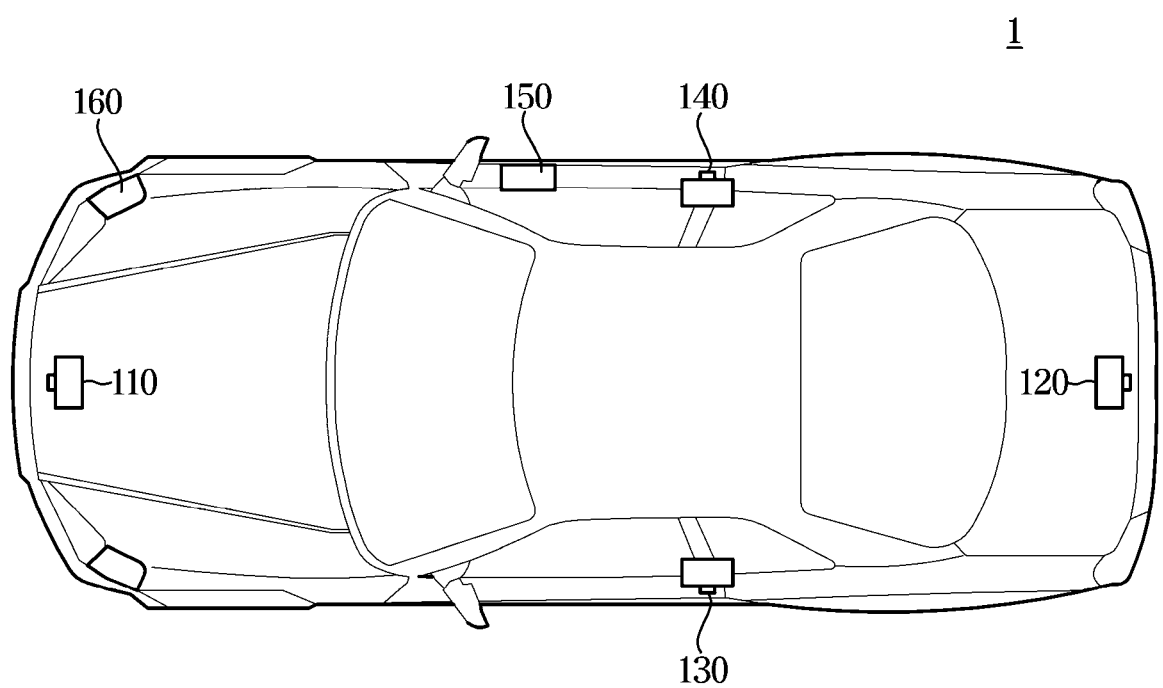
FIG. 1 is a plan view of a vehicle according to an embodiment of the disclosure.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Further, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

FIG. 1 is a plan view of a vehicle according to an embodiment of the disclosure.

Figure 2:
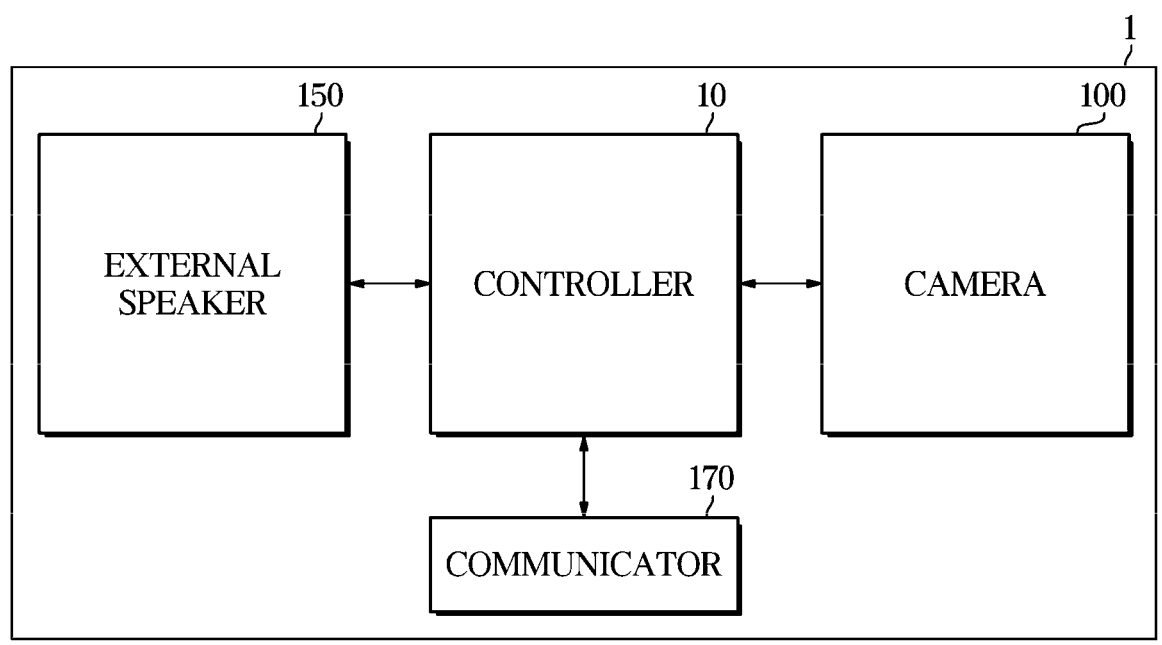
FIG. 2 is a control block diagram of a vehicle according to an embodiment of the disclosure.
Figure 2:
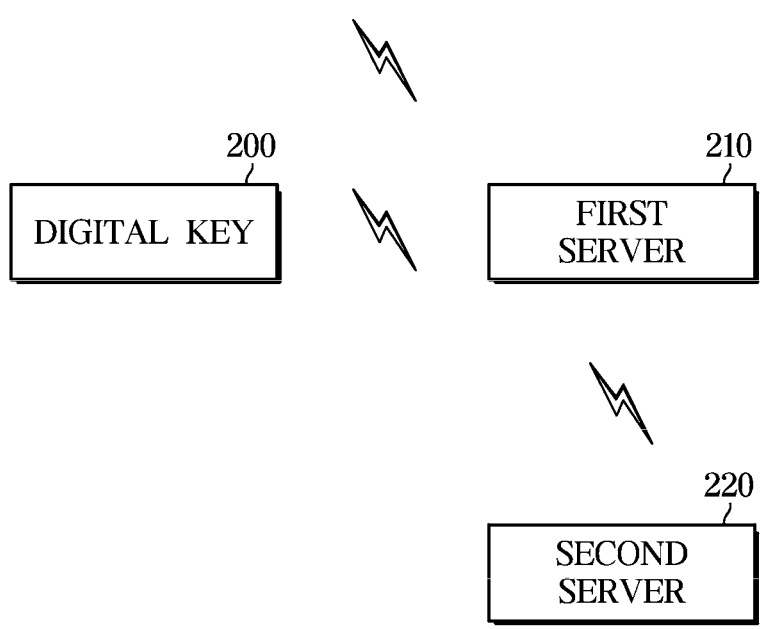

FIG. 2 is a control block diagram of a vehicle according to an embodiment of the disclosure.

Figure 3:
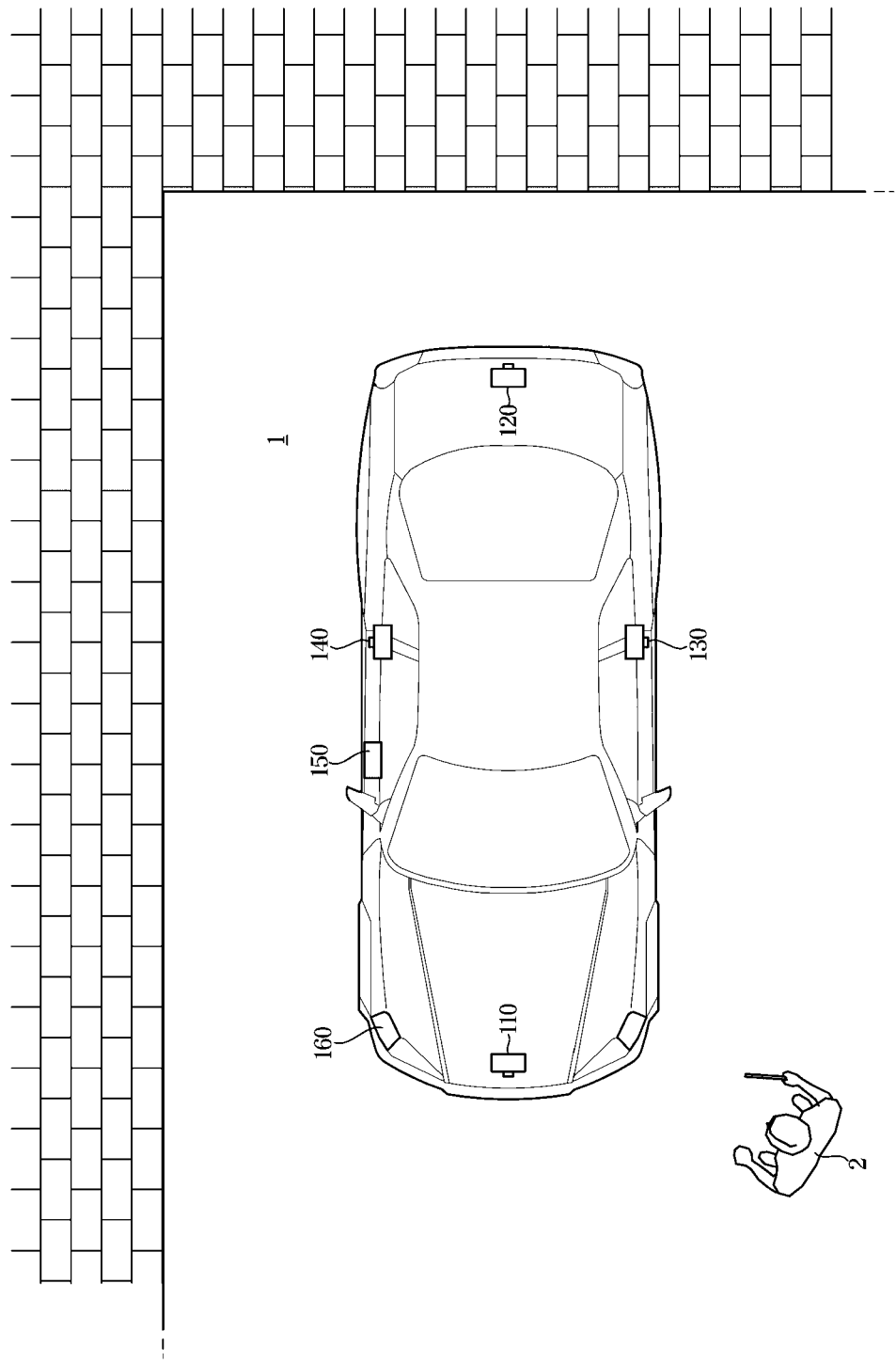
FIG. 3 is a plan view of a vehicle according to another embodiment of the disclosure.

FIG. 3 is a plan view of a vehicle according to another embodiment of the disclosure.

Referring to FIGS. 1 and 2, a vehicle 1 may include a plurality of cameras 100 (110, 120, 130, 140) for capturing a surrounding situation of the vehicle 1, an external speaker 150 for outputting a sound to the outside of the vehicle 1, and a communicator 170 communicating with a first server 210, and a controller 110 for determining a degree of risk of a dangerous situation when the dangerous situation is captured through the plurality of cameras 100 (110, 120, 130, 140).

The controller 110 may control an Ultra Wide Band (UWB) module to detect obstacles around the vehicle 1 based on the degree of risk, control at least one of a digital key 200 and the external speaker 150 to output a message for the dangerous situation or an image in which the dangerous situation is captured, and transmit the image in which the dangerous situation is captured to the first server 210 based on the degree of risk. The first server 210 may transmit the message and the captured image to a second server 220 based on the degree of risk.

When the dangerous situation is captured through the cameras 100, the controller 10 may store the image of the dangerous situation in a storage in the vehicle 1.

When the dangerous situation is captured, the controller 10 may store the image of the dangerous situation in the storage in the vehicle 1.

When the dangerous situation is captured, the controller 10 may search for position information of the digital key 200. Here, the controller 10 may control the UWB module to search for the position information of the digital key 200, and may search for the position information of the digital key 200 using the UWB module.

In more detail, when the position information of the digital key 200 is searched, the controller 10 may determine that the position of the digital key 200 is located in a short distance from the vehicle 1, and may directly transmit the message for the dangerous situation to the digital key 200.

In this case, when the position of the digital key 200 is located in the short distance from the vehicle 1, the controller 10 may control the digital key 200 to automatically output the message for the dangerous situation.

In addition, when the position of the digital key 200 is located in the short distance from the vehicle 1, the controller 10 may directly transmit the image in which the dangerous situation is captured to the digital key 200, and may control the digital key 200 so that the image is automatically output.

Here, when the position of the digital key 200 is located in the short distance from the vehicle 1, the controller 10 may control the image in which the dangerous situation is captured to be streamed in real time from the digital key 200.

When the position information of the digital key 200 is not searched, the controller 10 may determine that the position of the digital key 200 according to the position information of the digital key 200 is far from the vehicle 1, and it is difficult to directly transmit the message for the dangerous situation to the digital key 200, so that it can be transmitted to the digital key 200 through the first server 210.

The controller 10 may transmit the message for the dangerous situation to the digital key 200. After automatically outputting the message to the digital key 200, the controller 10 may determine whether a user input is received by the digital key 200 after a predetermined time.

In more detail, the controller 10 may periodically transmit a control signal to the digital key 200 to determine whether the user input has been received by the digital key 200 for the predetermined time. When the user input is received to the digital key 200 within the predetermined time, the controller 10 may receive a response signal from the digital key 200.

When the response signal is not received from the digital key 200 within the predetermined time, the controller 10 may determine that the user input has not been received by the digital key 200.

When the user input is not received by the digital key 200 for the predetermined time, the controller 10 may determine that the user has not recognized the dangerous situation of the vehicle 1, and may retransmit or re-output the message about the dangerous situation to another digital key related to the vehicle 1.

Here, another digital key may be set in advance by the user.

The controller 10 may control a power of some of the cameras 100 (110, 120, 130, 140) based on the degree of risk of the dangerous situation.

In more detail, referring to FIG. 1, when the dangerous situation around the vehicle 1 is captured through a first camera 110 as a front camera and a second camera 120 as a rear camera, the controller 10 may control the power of a third camera 130 disposed on a left side of the vehicle 1 and a fourth camera 140 disposed on a right side of the vehicle 1 in an ON state, in order to enhance a security state of the vehicle 1 based on the degree of risk of the dangerous situation.

In addition, when the dangerous situation is not captured around the vehicle 1 while the power of the first camera 110 as the front camera and the second camera 120 as the rear camera is turned on, the controller 10 may maintain the power of the third camera 130 disposed on the left side and the fourth camera 140 disposed on the right side of the vehicle 1 in an OFF state.

For example, as illustrated in FIG. 3, when the user parks in an area surrounded by a wall on the right side and the rear of the vehicle 1, the controller 10 may automatically turn on the first camera 110 and the third camera 130 and control the power of the second camera 120 and the fourth camera 140 to be turned off.

When a movement of a suspicious person 2 is captured from the first camera 110 and the third camera 130 or the dangerous situation is captured, the user may input into the digital key 200 to turn on the power of the second camera 120 and the fourth camera 140 according to the movement of the suspicious person 2.

At this time, the controller 10 may warn the suspicious person 2 by controlling ON and OFF of an emergency light 160 of the vehicle 1 according to the position of the suspicious person 2.

The third camera 130 and the fourth camera 140 may be Surround View Monitor (SVM), and may be face recognition access cameras, but are not limited thereto.

The controller 10 may control the power of some of the cameras 100 (110, 120, 130, and 140) based on the user input received by the digital key 200.

For example, as illustrated in FIG. 3, when the user parks in the area surrounded by the wall on the right side and the rear of the vehicle 1, the user may input the digital key 200 to turn on the first camera 110 and the third camera 130 and turn off the power of the second camera 120 and the fourth camera 140.

The controller 10 may automatically execute a long-term recording function of the plurality of cameras 100 when the dangerous situation is captured, and automatically terminate the long-term recording function of the plurality of cameras 100 when the dangerous situation ends.

When the vehicle 1 is parked or stopped, a time to take the image by turning on the cameras 100 and a time to record the image may be a time input by the user through the digital key 200.

The controller 10 may periodically control the power of some of the plurality of cameras 100 (110, 120, 130, 140) when the user parks in the dangerous area based on navigation and information related to a dangerous area stored in the first server 210.

Here, the danger area may not be an area in which a parking is permitted or may be an accidental area, but is not limited thereto.

Based on at least one of the navigation and information related to the dangerous area stored in the first server 210, the user input received in the digital key 200, and the degree of risk of the dangerous situation, the controller 10 may automatically set an ON or OFF maintenance time of the emergency light 160 of the vehicle 1.

At this time, a time to maintain the emergency light 160 ON or OFF when the vehicle 1 is in the parking and stopping state may be a time input by the user through the digital key 200.

The controller 10 may control the UWB module to detect obstacles around the vehicle 1 based on the degree of risk of the dangerous situation. In more detail, when the degree of risk of the dangerous situation is high, and the degree of risk is high, for security of the vehicle 1, the controller 10 may control not only the plurality of cameras 100, but also the UWB module to detect the obstacles around the vehicle 1.

When the degree of risk of a dangerous situation is changed from a high level of a high risk to a low level of a low risk, in order to reduce power consumption, the controller 10 may control the UWB module to stop detecting the obstacles around the vehicle 1.

The controller 10 may transmit the message corresponding to the degree of risk of the dangerous situation to the external speaker 150 and control the external speaker 150 so that the external speaker 150 outputs a voice corresponding to the message.

The controller 10 may control the external speaker 150 to automatically output the user's voice received by the digital key 200 from the external speaker 150.

The controller 10 may provide a push notification to the digital key 200 based on the degree of risk of the dangerous situation.

When there is the user in the vehicle 1, the controller 10 may output the message corresponding to the degree of risk on an Audio Video Navigation (AVN) screen so that the user can recognize it.

The controller 10 may provide the push notification to the AVN based on the degree of risk of the dangerous situation.

The controller 10 may transmit the image in which the dangerous situation is captured to the first server 210 based on the degree of risk of the dangerous situation.

The controller 10 may transmit the position information of the vehicle 1 at the time when the dangerous situation occurs to the first server 210 based on the degree of risk of the dangerous situation.

The controller 10 may transmit the image in which the dangerous situation is captured to the first server 210 based on the degree of risk of the dangerous situation.

The controller 10 may provide the image and the message in which the dangerous situation is captured to the digital key 200 and the first server 210 by using at least one of Bluetooth, UWB, and LTE, which are short-range communication, and LTE, which is a long-distance communication.

The first server 210 may store the image in which the dangerous situation is captured and the position information of the vehicle 1 at the time when the dangerous situation occurs. In more detail, the first server 210 may selectively store the image in which the dangerous situation is captured according to a storage capacity. In addition, the first server 210 may selectively store all or only part of the image in which the dangerous situation is captured based on the degree of risk of the dangerous situation.

Based on the degree of risk, the first server 210 may transmit the image in which the dangerous situation is captured and the position information of the vehicle 1 at the time when the dangerous situation occurs to the second server 220. In addition, the first server 210 may transmit the captured image for the dangerous situation to the second server 220.

For example, when a crime related to an area where the vehicle 1 is parked occurs, the controller 10 may transmit the image of the dangerous situation stored in the first server 210 and the position information of the vehicle 1 to the second server 220. In this case, the captured image and the position information may be anonymized and transmitted to the second server 220.

Here, the first server 210 may be one of the external servers of the vehicle 1 that stores information related to the vehicle 1, and the second server 220 may be one of the external servers of an external security company or a police station.

When the dangerous situation is captured, the controller 10 may determine whether the situation captured by the cameras 100 is the dangerous situation by performing a suspect determination algorithm.

The controller 10 may determine the degree of risk of the dangerous situation when it is determined that it is the dangerous situation by performing the suspect determination algorithm.

Here, the suspect determination algorithm may be an algorithm for determining a person who has an intention of the crime through the image captured by the cameras 100. In more detail, by recognizing a physiological of a person through an image mapping captured by the cameras 100 so as to recognize a minute vibration of the person around the vehicle 1, it is possible to determine the person with the intention of the crime.

Here, the dangerous situation may be a situation in which a person looking around the vehicle 1 exists, but is not limited thereto.

The controller 10 may include a non-transitory memory storing an algorithm to control operation of the components in the vehicle 1 or data about a program that implements the algorithm, and a processor carrying out the aforementioned operation using the data stored in the memory. The memory and the processor may be implemented in separate chips. Alternatively, the memory and the processor may be implemented in a single chip.

A storage may correspond to a memory that stores the above-mentioned information and information described later. In order to store various types of information, the storage may be implemented with at least one of the non-volatile memory device, such as cache, read only memory (ROM), programmable ROM (PROM), erasable programmable ROM (EPROM), electrically erasable programmable ROM (EEPROM), a volatile memory device, such as random access memory (RAM), or a storage medium, such as a hard disk drive (HDD) or a compact disk (CD) ROM, without being limited thereto.

The cameras 100 may have a plurality of channels, and may obtain the image around the vehicle 1.

It goes without saying that the camera 100 can be provided in the vehicle 1 to perform an operation of a Surround View Monitor (SVM).

The camera 100 may be provided on the front, rear, left, or right side of the vehicle 1, but is not limited thereto. In this case, the camera 100 provided on the left and right sides of the vehicle 1 may be the SVM.

The camera 100 may be provided on a window glass inside the vehicle 1, may be provided on a room mirror inside the vehicle 1, and may be provided with a roof panel, but may be provided to be exposed to the outside, but is limited thereto.

The camera 100 may include a Charge-Coupled Device (CCD) camera or a CMOS color image sensor. Here, both the CCD and CMOS may refer to a sensor that converts and stores light input through a lens of the camera 110 into an electrical signal.

The communicator 170 may communicate with the first server 210.

The communicator 170 may transmit and receive information with external server using various methods such as Radio Frequency (RF), Wireless Fidelity (Wi-Fi), Bluetooth, Zigbee, Near Field Communication (NFC), and Ultra-Wide Band (UWB) communication. A method of performing communication with the external server is not limited to the above-described method, and any method may be used as long as it is a method capable of communicating with the external server.

In more detail, with reference to FIG. 2, the communicator 170 is illustrated as a single configuration factor for transmitting and receiving signals, but is not limited thereto, and a transmitter for transmitting the signal and a receiver for receiving the signal may be composed of a separate existence.

FIGS. 4A-4B are views illustrating a screen output to a digital key of a vehicle according to an embodiment of the disclosure.

When the vehicle 1 is parked, the vehicle 1 may capture the situation around the vehicle 1 through the camera 100 and determine whether the captured situation is the dangerous situation.

Referring to FIG. 4A, when the position at which the vehicle 1 is parked through the first server 210 and the navigation is the dangerous area or a no-parking area, the vehicle 1 may determine the user is still inside the vehicle 1. When the user is inside the vehicle 1, the vehicle 1 may output a message "Parking here is dangerous" on the AVN screen of the vehicle 1.

Referring to FIG. 4B, when the user is outside the vehicle 1, the digital key 200 may output a message saying "It's dangerous where you park right now".

For example, when the degree of risk of the dangerous situation around the vehicle 1 is at the low level, the digital key 200 may only output the push notification. When the degree of risk is at a normal level, the digital key 200 may output the push notification and the message together.

FIGS. 5A-5E are views illustrating a message for a voice output to an external speaker of a vehicle according to an embodiment of the disclosure.

When the vehicle 1 is parked, the vehicle 1 may capture the situation around the vehicle 1 through the camera 100 and determine whether the captured situation is the dangerous situation.

Referring to FIG. 5A, when it is determined that this is the dangerous situation, the vehicle 1 may output a voice "Please move away from the vehicle" from the external speaker 150.

Referring to FIG. 5B, when the degree of risk of the dangerous situation is normal, the external speaker 150 may output a voice saying "I will start recording video from now on".

Referring to FIG. 5C, when the degree of risk of the dangerous situation is high, the external speaker 150 may output a voice saying "If you take a dangerous action, you will be automatically connected to the police station."

Referring to FIG. 5D, when the degree of risk in the dangerous situation is high, the external speaker 150 may output a voice input by the user on the digital key 200, "I am the owner of the vehicle. What is going on?"

Referring to FIG. 5E, when the degree of risk in the dangerous situation is high, the external speaker 150 may output a voice input by the user on the digital key 200, "I am the owner of the vehicle. Please step out of the vehicle. You may get hurt."

As described above, various messages may be output according to the degree of risk of the dangerous situation, but is not limited thereto.

Figure 6:
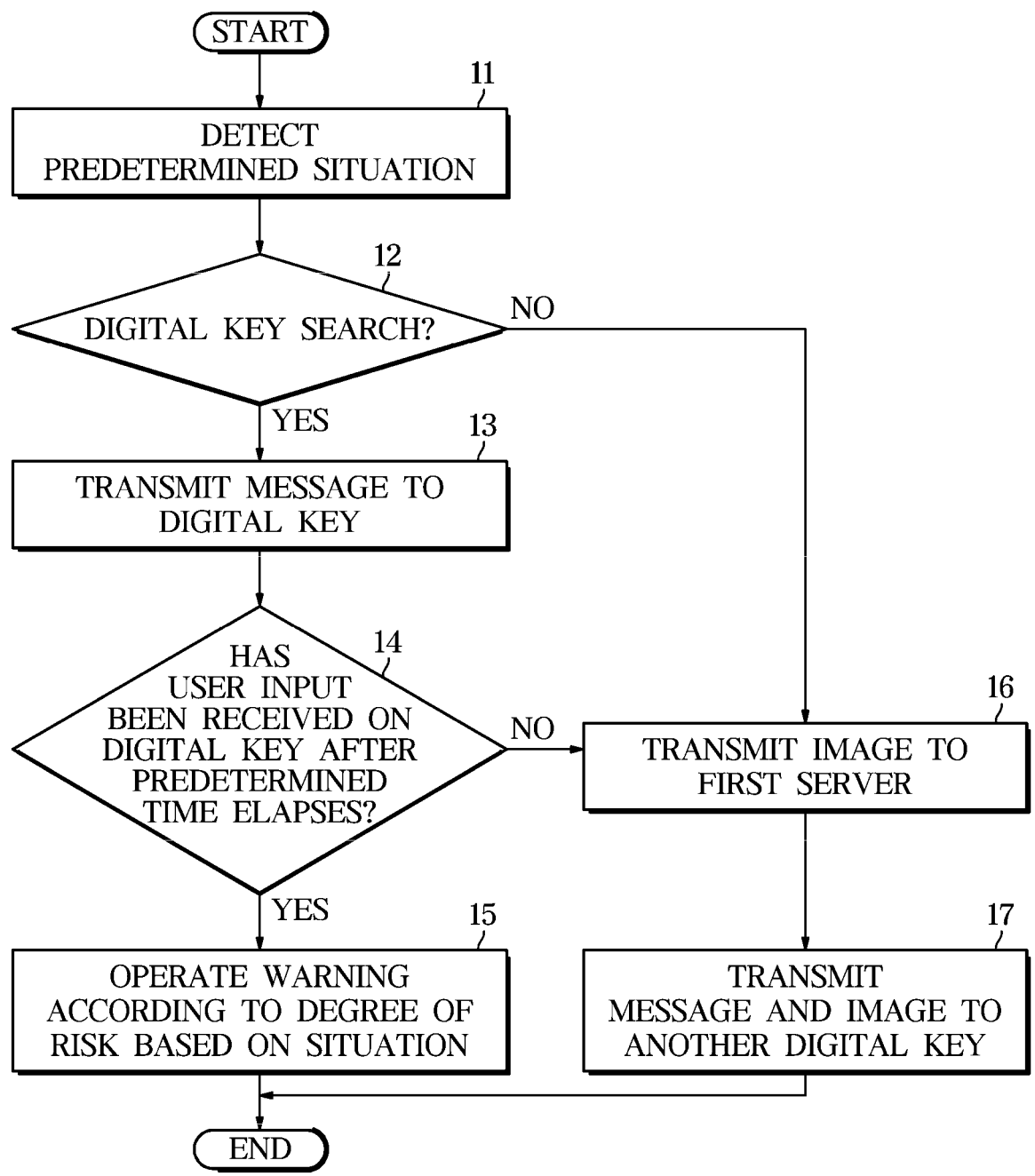
FIG. 6 is a flowchart illustrating a method of controlling a vehicle according to another embodiment of the disclosure.

FIG. 6 is a flowchart illustrating a method of controlling a vehicle according to another embodiment of the disclosure.

Referring to FIG. 6, the vehicle 1 may determine whether a predetermined dangerous situation has been captured through the plurality of cameras 100 at 11.

Here, the dangerous situation may be a situation in which the person looking around the vehicle 1 exists, and for example, when the position of the vehicle 1 is an accidental area, it may be determined that the surroundings of the vehicle 1 are the dangerous situation.

When the dangerous situation is captured, the vehicle 1 may determine the degree of risk of the dangerous situation.

In addition, the power of the plurality of cameras 100 may be controlled according to the degree of risk of the dangerous situation.

For example, when the dangerous situation around the vehicle 1 is captured through the first camera 110 as the front camera and the second camera 120 as the rear camera, in order to enhance the security state of the vehicle 1 based on the degree of risk of the dangerous situation, the vehicle 1 may control the power of the third camera 130 disposed on the left side of the vehicle 1 and the fourth camera 140 disposed on the right side of the vehicle 1 in the ON state.

For example, when the dangerous situation around the vehicle 1 is captured through the first camera 110 as the front camera and the second camera 120 as the rear camera, the vehicle 1 may control the UWB module to detect the obstacles around the vehicle 1. In more detail, when the degree of risk of the dangerous situation is high and the degree of risk of the vehicle 1 is high, for the security of the vehicle 1, the controller 10 may control not only the plurality of cameras 100, but also the UWB module to detect the obstacles around the vehicle 1.

When the dangerous situation is captured, the vehicle 1 may search for the position information of the digital key 200 at 12.

When the position information of the digital key 200 is searched, the vehicle 1 may determine that the position of the digital key 200 is located in a short distance from the vehicle 1, and may directly transmit the message for the dangerous situation and the image in which the dangerous situation is captured to the digital key 200 at 13.

In more detail, based on the degree of risk of the dangerous situation, the vehicle 1 may control the digital key 200 to automatically output the message about the dangerous situation and the image in which the dangerous situation is captured.

When the position information of the digital key 200 is not searched, the vehicle 1 may determine that the position of the digital key 200 is far from the vehicle 1, and may transmit a message and a captured image to the digital key 200 through the first server 210. Here, the first server 210 may selectively store the message and the captured image received from the vehicle 1 based on the degree of risk of the dangerous situation.

In this case, the vehicle 1 may transmit image information or graphic processing data to the digital key 200 using the UWB module.

After transmitting the message and the image information to the digital key 200, the vehicle 1 may determine whether the user input has been received by the digital key 200 after a predetermined time elapses at 14.

When the user input is received by the digital key 200 after the predetermined time, the vehicle 1 may operate a warning according to the degree of risk of the dangerous situation at 15.

When the user input is not received by the digital key 200 after the predetermined time, the vehicle 1 may transmit the message and the image information to the first server 210 at 16. In addition, the vehicle 1 may retransmit or re-output the message and the image information to another digital key related to the vehicle 1 at 17.

FIG. 7 is a flowchart illustrating a method of controlling a vehicle according to another embodiment of the disclosure.

Referring to FIG. 7, a warning method based on the degree of risk of the dangerous situation occurring around the vehicle 1 is illustrated.

When the degree of risk of the dangerous situation is the low risk, which is the low level, the vehicle 1 may warn a suspect by controlling the emergency light 160 of the vehicle 1. The vehicle 1 may transmit the message about the dangerous situation to the digital key 200 in response to a case where the degree of risk is the low risk, so that the user can recognize the situation around the vehicle 1. For example, a message transmitted to the digital key 200 says "There is the suspect around the vehicle" at 15-1.

In addition, in response to the case in which the degree of risk of the dangerous situation is the low risk, the vehicle 1 may be controlled to output only the push notification to the digital key 200.

When the degree of risk of the dangerous situation is a medium risk of an intermediate level, the vehicle 1 may warn the suspect by controlling the external speaker 150 to output the voice corresponding to the message. For example, the message output from the external speaker 150 may be "Please withdraw from the vehicle."

In addition, when the degree of risk of the dangerous situation is the medium risk of the intermediate level, the vehicle 1 may inform the user to recognize the surrounding situation of the vehicle 1 by controlling the digital key 200 to automatically output the voice corresponding to the message at 15-2.

When the degree of risk of the dangerous situation is the high risk, the vehicle 1 may output a theft alarm, and may warn the suspect by controlling the external speaker 150 to output the voice corresponding to the message.

In addition, when the degree of risk of the dangerous situation is the high risk, which is the high level, the vehicle 1 may transmit the image of the dangerous situation captured by the camera 100 to the digital key 200.

In addition, by controlling the vehicle 1 to automatically output the image from the digital key 200, the vehicle 1 may inform the user to recognize the surrounding situation of the vehicle 1 at 15-3.

In addition, when the degree of risk of the dangerous situation is the high risk, the vehicle 1 may transmit the image of the dangerous situation captured by the camera 100 and the position information of the vehicle 1 at the time when the dangerous situation occurs to the first server 210.

When the degree of risk of the dangerous situation is the high risk, which is the high level, the first server 210 may transmit the image in which the dangerous situation is captured and the position information of the vehicle 1 at the time when the dangerous situation occurs to the second server 220. In addition, the first server 210 may transmit the captured image for the dangerous situation to the second server 220.

In addition, the vehicle 1 may transmit the image in which the dangerous situation is captured and the position information of the vehicle 1 at the time when the dangerous situation occurs to a designated number corresponding to the dangerous situation at 15-4.

Here, the first server 210 may be the one of the external servers of the vehicle 1 that stores the information related to the vehicle 1, and the second server 220 may be the one of the external servers of the external security company or the police station. In this case, the designated number may be a number corresponding to the external security company or the police station, but is not limited thereto.

According to the embodiments of the disclosure, it is possible to minimize the user's anxiety by determining the presence or absence of the suspect or the dangerous situation occurring around the vehicle.

In addition, by determining the presence or absence of the suspect, there is an effect of preventing intelligent crime in advance.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a non-transitory computer-readable recording medium.

The non-transitory computer-readable recording medium may include all types of recording media storing commands that may be interpreted by a computer. For example, the non-transitory computer-readable recording medium may be, for example, ROM, RAM, a magnetic tape, a magnetic disc, flash memory, an optical data storage device, and the like.

Embodiments of the disclosure have thus far been described with reference to the accompanying drawings. It should be apparent to those of ordinary skill in the art that the disclosure may be practiced in other forms than the embodiments as described above without changing the technical idea or essential features of the disclosure. The above embodiments are only by way of example, and should not be interpreted in a limited sense.

The invention claimed is:

1. A vehicle comprising:
a plurality of cameras configured to capture a surrounding situation of the vehicle;
an external speaker configured to output a sound to an outside of the vehicle;
a communicator configured to communicate with a first server, the communicator including an Ultra Wide Band (UWB) module, wherein the UWB module is configured to detect obstacles around the vehicle; and
a controller configured to:
based on a case where a dangerous situation is captured through the plurality of cameras, determine a degree of risk of the dangerous situation;
when the degree of risk of the dangerous situation is at a first level control the UWB module and the plurality of cameras to detect obstacles around the vehicle, and transmit images captured by the plurality of cameras to the first server through the UWB module;
when the degree of risk of the dangerous situation is at a second level, the second level being lower than the first level, control the UWB module to stop detecting the obstacles around the vehicle, control the plurality of cameras to detect obstacles around the vehicle, and transmit the images captured by the plurality of cameras to the first server through the UWB module; and
control at least one of a digital key and an external speaker to output a message for the dangerous situation or the images captured by the plurality of cameras.

2. The vehicle according to claim 1, wherein the controller is configured to control a power of some of the plurality of cameras based on at least one of the degree of risk and a user input received on the digital key.

3. The vehicle according to claim 1, wherein the controller is configured to:
based on the case in which the dangerous situation is captured through the plurality of cameras, search position information of the digital key;

based on the position information of the digital key and the degree of risk, transmit the image in which the dangerous situation is captured to the digital key; and control to output the captured image from the digital key.

4. The vehicle according to claim 1, wherein the controller is configured to control the external speaker to output at least one of a user's voice received by the digital key and a voice corresponding to the message for the dangerous situation.

5. The vehicle according to claim 1, wherein, based on a case where a user input is not received in the digital key for a predetermined time after transmitting the message for the dangerous situation to the digital key, the controller is configured to retransmit the message for the dangerous situation to another digital key.

6. The vehicle according to claim 1, wherein the controller is configured to perform a suspect determination algorithm to determine whether the situation captured from the plurality of cameras is the dangerous situation.

7. The vehicle according to claim 1, wherein, based on the degree of risk, the first server is configured to store at least one of the image in which the dangerous situation is captured, the image for the dangerous situation, and position information of the vehicle at a time when the dangerous situation occurs.

8. The vehicle according to claim 1, wherein the first server is configured to transmit the image in which the dangerous situation is captured to a second server based on the degree of risk.

9. The vehicle according to claim 8, wherein:
the first server is an external server of the vehicle that stores information related to the vehicle; and
the second server is a server of an external company.

10. The vehicle according to claim 1, wherein the controller is configured to provide a push notification to the digital key based on the degree of risk.

11. A method of controlling a vehicle comprising:
based on a case where a dangerous situation is captured through a plurality of cameras, determining, by a controller, a degree of risk of the dangerous situation;
when the degree of risk of the dangerous situation is at a first level, controlling, by the controller, an Ultra Wide Band (UWB) module and the plurality of cameras to detect obstacles around the vehicle, transmitting images captured by the plurality of cameras to a first server through the UWB module;
when the degree of risk of the dangerous situation is at a second level, the second level being lower than the first level controlling, by the controller, the UWB module to stop detecting the obstacles around the vehicle, controlling the plurality of cameras to detect obstacles around the vehicle, and transmitting the images captured by the plurality of cameras to the first server through the UWB module; and
controlling, by the controller, at least one of a digital key and an external speaker to output a message for the dangerous situation or the images captured by the plurality of cameras.

12. The method according to claim 11, further comprising:
controlling, by the controller, a power of some of the plurality of cameras based on at least one of the degree of risk and a user input received on the digital key.

13. The method according to claim 11, further comprising:
based on the case in which the dangerous situation is captured through the plurality of cameras, searching, by the controller, position information of the digital key;
based on the position information of the digital key and the degree of risk, transmitting, by the controller, the image in which the dangerous situation is captured to the digital key; and
controlling, by the controller, to output the captured image from the digital key.

14. The method according to claim 11, further comprising:
controlling, by the controller, the external speaker to output at least one of a user's voice received by the digital key and a voice corresponding to the message for the dangerous situation.

15. The method according to claim 11, further comprising:
based on a case where a user input is not received in the digital key for a predetermined time after transmitting the message for the dangerous situation to the digital key, retransmitting, by the controller, the message for the dangerous situation to another digital key.

16. The method according to claim 11, further comprising:
performing, by the controller, a suspect determination algorithm to determine whether the situation captured from the plurality of cameras is the dangerous situation.

17. The method according to claim 11, wherein, based on the degree of risk, the first server is configured to store at least one of the image in which the dangerous situation is captured, the image for the dangerous situation, and position information of the vehicle at a time when the dangerous situation occurs.

18. The method according to claim 11, wherein the first server is configured to transmit the image in which the dangerous situation is captured to a second server based on the degree of risk.

19. The method according to claim 18, wherein:
the first server is an external server of the vehicle that stores information related to the vehicle; and
the second server is a server of an external company.

20. The method according to claim 11, further comprising:
providing, by the controller, a push notification to the digital key based on the degree of risk.

* * * * *